(No Model.)
H. P. NEVIN & W. S. FARRAR.
ROUTING MACHINE.
No. 490,492. Patented Jan. 24, 1893.
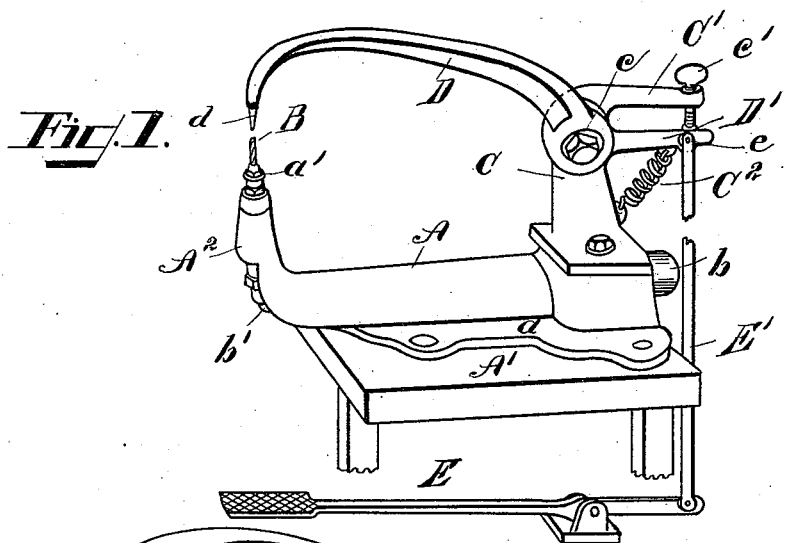
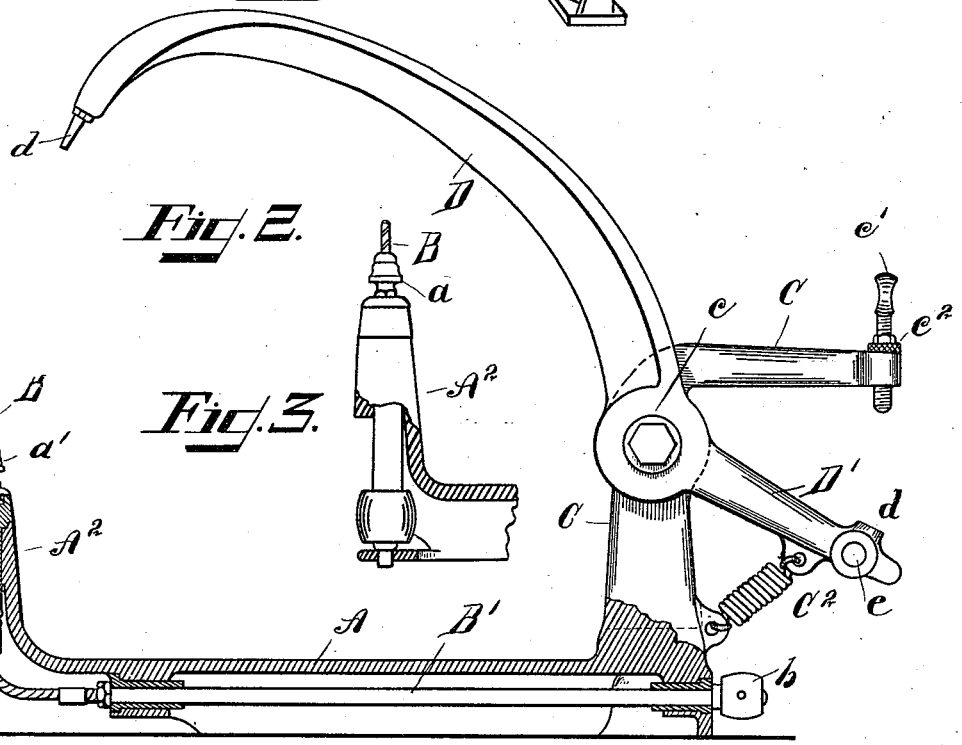
WITNESSES
F. Clough.
D. W. Bradford.
INVENTORS
Harper P. Nevin
William S. Farrar
by Parker & Burton
Attorneys.

UNITED STATES PATENT OFFICE.

HARPER P. NEVIN AND WILLIAM S. FARRAR, OF DETROIT, MICHIGAN.

ROUTING-MACHINE.

SPECIFICATION forming part of Letters Patent No. 490,492, dated January 24, 1893.

Application filed February 9, 1892. Serial No. 420,892. (No model.)

*To all whom it may concern:*

Be it known that we, HARPER P. NEVIN, a citizen of the United States, and WILLIAM S. FARRAR, a subject of the Queen of Great Britain, both residing at Detroit, county of Wayne, State of Michigan, have invented a certain new and useful Improvement in Routing-Machines; and we declare the following to be a full, clear, and exact description of the invention, such as will enable others skilled in the art to which it pertains to make and use the same, reference being had to the accompanying drawings, which form a part of this specification.

Our invention relates to machines for pattern makers' use, and its object is an improvement in what we will term a routing machine to be used for cutting away the back of patterns to conform to the front of the pattern, and reducing them to a uniform thickness. After the patterns have been carved or otherwise formed on the face, it is desirable to cut away the back to conform to the face, leaving the whole pattern of a uniform thickness, and reducing the weight of the casting to be made from the pattern. As it is necessary to use great care and skill in removing the material from the back so as not to destroy the pattern, it is often more difficult to cut out the back of the pattern than to carve or form the face. It is the design of our invention to facilitate this work and reduce the expense and the skill required to perform it.

In the drawings, Figure 1 is a perspective of the machine, made according to our invention. Fig. 2 is an elevation partly in section. Fig. 3, is an elevation showing the cutter head driven by belting instead of shafting.

In the drawings, A, is the horizontal portion of the frame, provided with flanges, $a$, through which to bolt it to the table, A'. This horizontal frame is provided at one end with a vertical portion $A^2$, in which is mounted the chuck $a'$, for holding the routing tool B. This routing tool is a small cutting tool usually a drill or similar tool.

In the horizontal frame A, is the shaft, B', provided at one end with the pulley $b$, and at the other end with any suitable gearing for transferring its motion to the vertical chuck $a'$. The form shown in the drawings is a flexible shaft, $b'$, which provides an efficient and noiseless means for connecting the driving and driven part at right angles. A bevel gear may be employed at this place, or the chuck may be provided at its lower end with a pulley and a belt run horizontally through the frame in the place of the shaft B'. Rising from the horizontal frame, A, is the vertical support, C, having an arm, C'. Pivoted to the support C, at, $c$, is an arm, D, D', in two parts; the part D, is curved into a gooseneck form and terminates with a stylus $d$; the part D' extends backward and is so formed that it closes against a stop screw $c'$. This arm D' is connected with the main support C, by the spring $C^2$, which acts to draw down the arm D', and elevate the forward part D, and stylus $d$. The point of the stylus $d$, is smooth and rounded so that it may bear against the work without cutting or injuring it; when the forward end of the arm D is depressed, the point $d$, meets the routing tool. In the outer end of the arm C', is provided the set screw, $c'$, preferably provided with a locking nut, $c^2$, and the outer end of the frame D', is adapted to abut against the lower end of this screw, and its upward movement is adjustably limited by the screw $c'$. This limitation of the upward movement of the arm D' also limits the downward movement of the point $d$, so that by adjusting the screw $c'$ the extreme downward movement of the point $d$, and its distance from the routing tool B, can be definitely adjusted.

We provide the foot lever, E, and the vertical rod E', connecting the foot lever with the arm D', at $e$, for forcing the arm D, and the point $d$, down to its position over the routing tool.

The routing tool is driven by any suitable power geared thereto through the pulley and through the shaft B'.

In the operation of our machine, we prefer to run the routing tool at a high speed, and having a pattern of which the back is to be routed out to correspond with the form of the face, we proceed as follows. The point $d$ is adjusted by means of the screw, $c'$, a distance from the end of the routing tool equal to the desired thickness of the completed pattern. The pattern is then passed under the point, and the arm D, is forced down by the foot lever, with the point resting against the face of the pattern, when the routing tool will enter the back of the pattern to a distance from the point, equal to the desired thickness of the pattern. By moving the work under the stylus $d$, and above the cutter, the back of the pattern will be cut away and the pattern will be left of a uniform thickness throughout. In operating the machine, the work should be moved in such a way that the tool will be presented to the back of the pattern at all times at right angles to that portion of the face which is immediately above it. Owing to the goose-neck form of the arm D, the pattern may be tipped in any direction to meet this requirement. When it is desired to remove the pattern by releasing the foot lever, the spring $C^2$, will lift the arm D, and leave plenty of room to remove the pattern above the routing tool.

What we claim is—

1. In a routing machine, the combination of a rotating cutter a smooth pointed holding guide in axial alignment with said cutter and means for moving the holding guide axially with respect to said cutter substantially as and for the purpose specified.

2. In a routing machine, the combination of a rotating cutter head, a smooth round pointed holding guide in axial alignment with said cutter head, means for moving the guide axially with respect to said cutter head and a stop limiting its approach thereto, substantially as and for the purpose described.

3. In a routing machine, the combination of a cutter head, a movable holding guide adapted to move into axial alignment therewith, a foot lever and suitable connecting links adapted to force said holding guide toward the cutting tool, an adjustable stop adapted to prevent the approach of the guide beyond a predetermined point, substantially as and for the purpose described.

4. In a routing machine, the combination of a cutter head fixed in position, a swinging goose neck terminating in a pointed holding guide, mechanism adapted to swing the goose neck, and thereby to bring the pointed holding guide opposite to and in axial alignment with the cutting tool, and a stop limiting the throw of the goose neck, substantially as and for the purpose described.

5. In a routing machine in combination with a rotatable cutting tool fixed in position, a pointed holding guide, a foot lever and suitable connecting links adapted to force said holding guide against a limiting stop, the bit of the cutting tool, and the stylus of the holding guide, both projecting from their respective supports whereby work may be held between the two at various angles with the axis of the cutter, substantially as and for the purpose described.

In testimony whereof we sign this specification in the presence of two witnesses.

HARPER P. NEVIN.
WILLIAM S. FARRAR.

Witnesses:
C. H. FISK,
MARION A. REEVE.